(12) United States Patent
Seväkivi et al.

(10) Patent No.: US 9,245,686 B2
(45) Date of Patent: Jan. 26, 2016

(54) CAPACITOR FASTENING

(71) Applicant: ABB Oy, Helsinki (FI)

(72) Inventors: Pertti Seväkivi, Helsinki (FI); Niko Björkman, Helsinki (FI)

(73) Assignee: ABB TECHNOLOGY OY, Helsinki (FI)

( * ) Notice: Subject to any disclaimer, the term of this patent is extended or adjusted under 35 U.S.C. 154(b) by 348 days.

(21) Appl. No.: 13/673,151

(22) Filed: Nov. 9, 2012

(65) Prior Publication Data

US 2013/0121757 A1 May 16, 2013

(30) Foreign Application Priority Data

Nov. 11, 2011 (FI) ...................................... 20116116

(51) Int. Cl.
*H02B 1/01* (2006.01)
*H01G 2/04* (2006.01)
*H01G 4/28* (2006.01)

(52) U.S. Cl.
CPC . *H01G 2/04* (2013.01); *H01G 4/28* (2013.01); *Y10T 403/4628* (2015.01)

(58) Field of Classification Search
CPC ............. H05K 3/30; H05K 7/04; H05K 7/14; H01G 4/38; H01G 2/02; H01G 2/04; H01G 2/06; H01G 2/08
USPC ........... 361/830, 274.3, 306.1, 328, 329, 520, 361/807; 174/58; 439/517
See application file for complete search history.

(56) References Cited

U.S. PATENT DOCUMENTS

| | | | | |
|---|---|---|---|---|
| 5,367,437 A | * | 11/1994 | Anderson | ...................... 361/807 |
| 5,805,411 A | * | 9/1998 | Anderson | .................. 361/306.1 |
| 6,265,661 B1 | * | 7/2001 | Schweikert et al. | ............ 174/58 |
| 8,654,545 B2 | | 2/2014 | Zengerle et al. | |
| 2003/0123217 A1 | * | 7/2003 | Nakamura et al. | ............ 361/520 |

(Continued)

FOREIGN PATENT DOCUMENTS

| | | |
|---|---|---|
| CN | 102160209 A | 8/2011 |
| CN | 202049861 U | 11/2011 |

(Continued)

OTHER PUBLICATIONS

Extended Search Report issued by the European Patent Office on Mar. 19, 2013, in the corresponding European Patent Application No. 12191899.9. (8 pages).

(Continued)

*Primary Examiner* — Xiaoliang Chen

(74) *Attorney, Agent, or Firm* — Buchanan Ingersoll & Rooney PC

(57) ABSTRACT

A capacitor fastening for fastening a capacitor to a panel, whereby the capacitor, when mounted in place, is positioned in the panel, fastened at its lower part. The capacitor fastening includes a retainer in the panel at the mounting point of the capacitor for preventing lateral movement of the capacitor in at least one selected direction; a tightening plate arranged above the panel and to be fastened to the panel, which tightening plate has a hole substantially corresponding to the diameter of the capacitor above the mounting point of the panel; and a wedge between the panel and the tightening plate for tightening the retainer of the panel and the edge of the hole in the tightening plate from opposite directions against the capacitor.

20 Claims, 2 Drawing Sheets

(56) References Cited

U.S. PATENT DOCUMENTS

| | | | | |
|---|---|---|---|---|
| 2003/0133251 | A1* | 7/2003 | Kitagawa et al. | 361/328 |
| 2005/0007725 | A1* | 1/2005 | Miettinen et al. | 361/329 |
| 2006/0028783 | A1* | 2/2006 | Miettinen et al. | 361/274.3 |
| 2011/0212648 | A1* | 9/2011 | Fish | 439/517 |
| 2011/0222261 | A1* | 9/2011 | Zengerle et al. | 361/830 |

FOREIGN PATENT DOCUMENTS

| | | |
|---|---|---|
| EP | 0 700 060 A1 | 3/1996 |
| JP | 58-120636 U | 8/1983 |
| JP | 61 079530 U | 5/1986 |
| JP | 3-222313 A | 10/1991 |
| JP | 6-120082 A | 4/1994 |

OTHER PUBLICATIONS

Finnish Search Report issued on Jul. 12, 2012, by the Finnish Patent Office for Application No. 20116116.

First Office Action issued by the Chinese Patent Office on Feb. 28, 2015, in corresponding Chinese Patent Application No. 201210447537.3, and an English translation thereof.

* cited by examiner

CAPACITOR FASTENING

RELATED APPLICATION

This application claims priority under 35 U.S.C. §119 to Finnish Patent Application No. 20116116 filed in Europe on Nov. 11, 2011, the entire content of which is hereby incorporated by reference in its entirety.

FIELD

The disclosure relates to capacitor fastening for fastening a capacitor to a panel, whereby the capacitor, when mounted in place, can be positioned in the panel and fastened there at its lower part. The capacitor fastening includes a retainer in the panel at the mounting point of the capacitor for preventing lateral movement of the capacitor in at least one selected direction, and a tightening plate arranged above the panel and to be fastened to the panel. The tightening plate has a hole substantially corresponding to the diameter of the capacitor above the mounting point of the panel. A wedge is provided between the panel and the tightening plate for tightening the capacitor in place between the panel and the plate.

BACKGROUND INFORMATION

Cylindrical capacitors, for example, can be difficult to fasten because their geometry usually does not contain actual fastening features. Another issue can arise from high manufacturing tolerances of capacitors.

A known fastening method includes a bolt attached to an end facing the capacitor terminals for fastening the capacitor to a plate underneath by a screw. Other known fastening methods include different band and clip fastenings.

From the point of view of mounting, the above fastening methods can be difficult and time-consuming. Because there are two mounting directions, one on the terminal side and the other on the side of the bottom screws, the part assembly may have been turned around during mounting. Many fastenings may be needed, whereby volume of the mounting space is wasted.

SUMMARY

A capacitor fastening is disclosed for fastening a capacitor, the capacitor fastening comprising a panel for fastening to a lower part of the capacitor, a retainer at a mounting point of the capacitor in the panel for preventing a lateral movement of the capacitor in at least one selected direction, a tightening plate for arranging above the panel and for fastening to the panel, the tightening plate having a hole substantially corresponding to a diameter of the capacitor above the mounting point of the panel, and a wedge between the panel and the tightening plate for tightening the capacitor in place between the panel and the plate, wherein the wedge includes wedging pins in the panel and corresponding wedging holes in the tightening plate, which, when brought into co-operation, are arranged to tighten the retainer of the panel and an edge of the hole of the tightening plate in opposite directions around the capacitor in directions perpendicular to an axial direction of the capacitor.

BRIEF DESCRIPTION OF THE DRAWINGS

Exemplary embodiments of the disclosure will now be described in more detail with reference to the attached drawings, in which.

DETAILED DESCRIPTION

Figure 1:
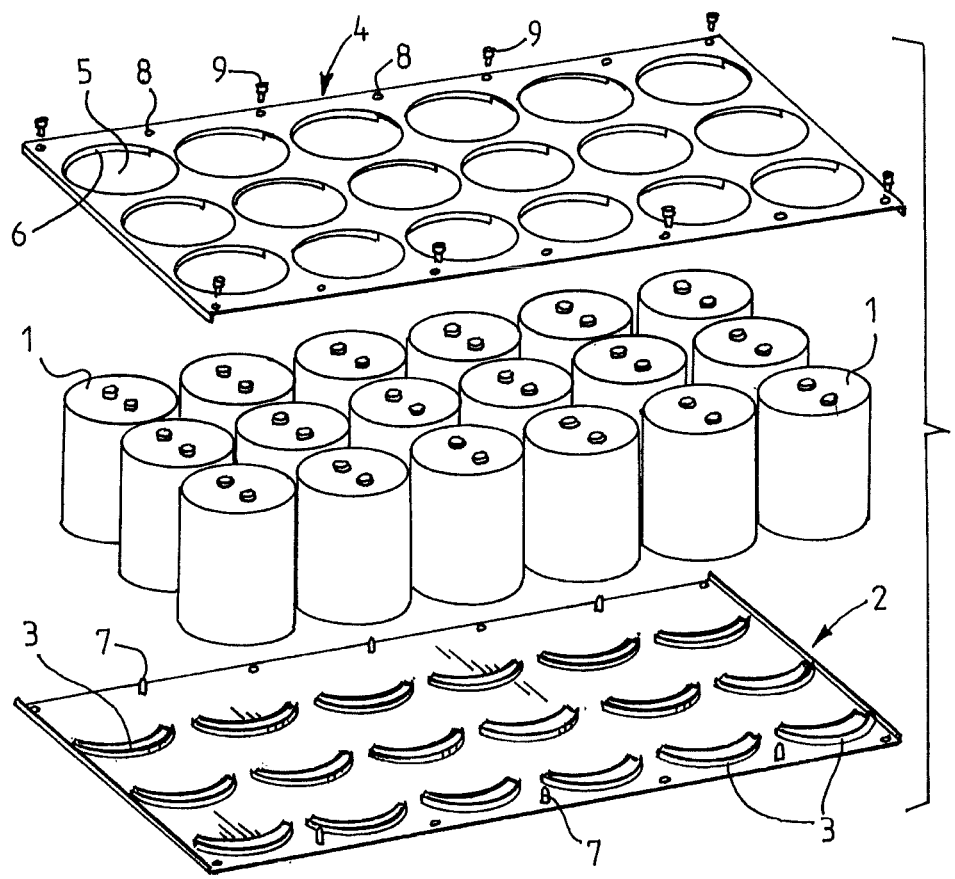
FIG. 1 is an explosive view of a capacitor fastening of an exemplary embodiment of the disclosure.
Figure 2:
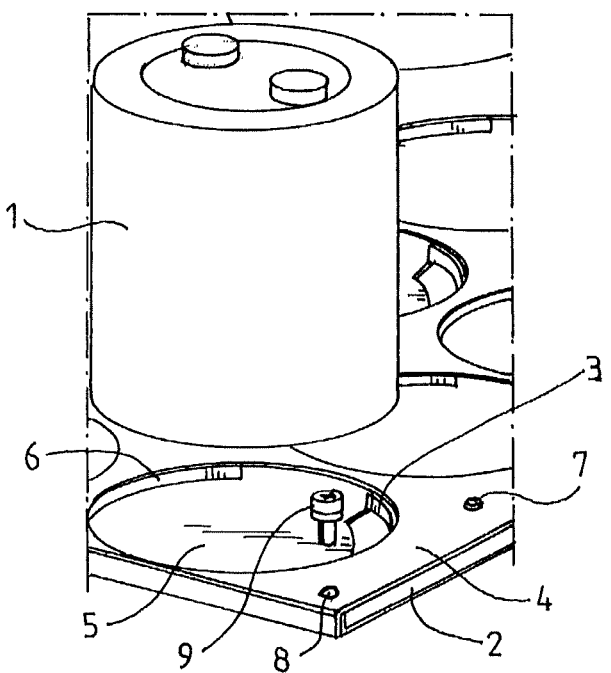
FIG. 2 illustrates a situation in which the capacitor is put in place into an assembly formed of a panel and a tightening plate of an exemplary embodiment of the disclosure.
Figure 3:
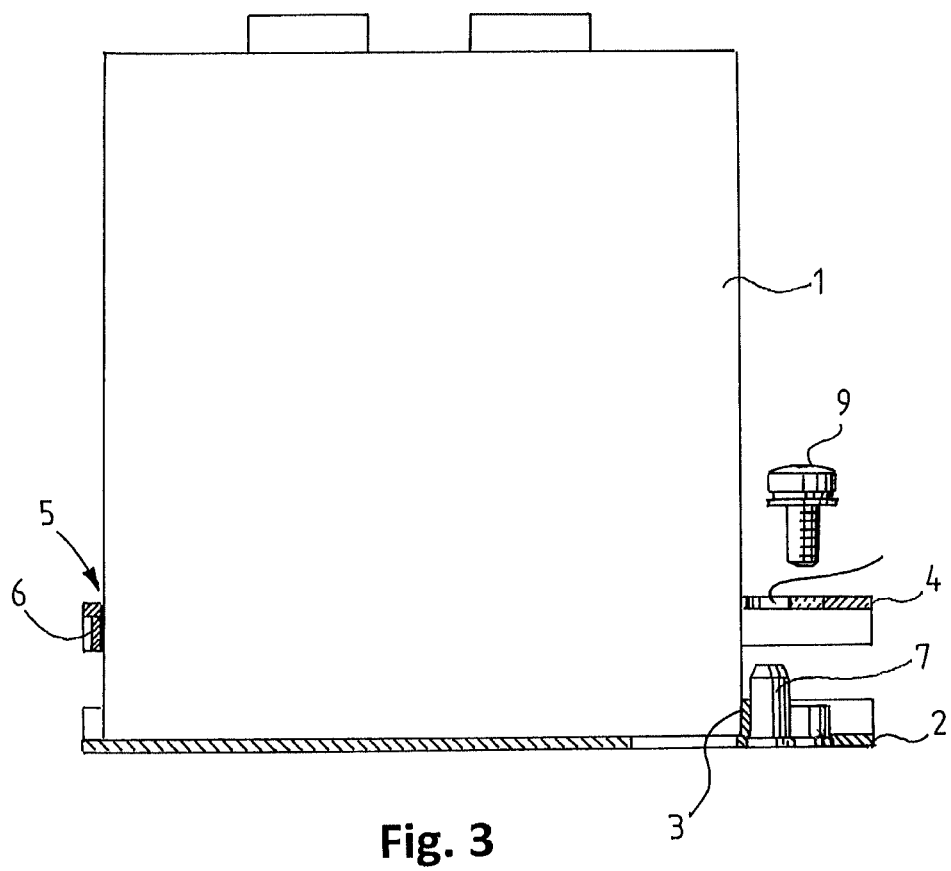
FIG. 3 illustrates an exemplary embodiment of the disclosure in which the capacitor is against the bottom plate but without the panel and its fastening screws mounted in place yet.

An exemplary embodiment of the disclosure can provide a new capacitor fastening wherein the wedge includes wedging pins provided in the panel and corresponding wedging holes provided in the tightening plate, the pins and holes, when in co-operation, being arranged to tighten the retainer of the panel and the edge of the tightening plate hole in opposite directions about the capacitor, perpendicular to an axial direction of the capacitor.

The disclosure is based on mounting the capacitor by two cross-tightening cellular plates. The plates tighten around the capacitor in a radial direction and, in addition, in a tightening step they wedge the capacitor tightly to the panel or the bottom plate.

The panel retainer can be formed of a curved collar corresponding to the shape of the outer surface of the capacitor rising from the panel, the collar extending on a pre-determined distance around the capacitor. Correspondingly, the hole in the tightening plate can be provided with a downward collar that is on an opposite side of the capacitor in relation to the collar in the panel and extends on a predetermined distance around the capacitor.

The panel retainer can also be formed of a recess made to the panel and matching the shape of the capacitor bottom.

In that case, an appropriate fastening of the panel and the tightening plate is realized by, for example, a screw fastening, which can act at the same time as a tightening mechanism for the wedge.

In an exemplary embodiment of the disclosure, capacitors with bottom screws are not needed and hence there are fewer parts to be mounted. In addition, all mounting works can be carried out from one direction without having to turn and rotate the capacitor system. Moreover, increased useful space is gained in the modules where the capacitors are placed, and the space can be utilized for larger capacitance or by using fewer capacitors of high capacitance, thus allowing cost savings. For example, when a capacitor with 20% more volume is used instead of a 100 mm high capacitor, four capacitors from a set of 20 may be left out. A capacitor without bottom screws can be less expensive, which allows capacitance to be increased by 20% at the same cost.

With reference to the drawings, a capacitor fastening of the disclosure is shown for fastening a capacitor 1 to a panel 2, the capacitor 1, when mounted in place, being fastened to the panel 2 by its lower portion.

The panel 2 of the drawings can be used for fastening a plural number of capacitors 1. The capacitors 1 to be fastened are of a type that has no bottom screw, or at least none is needed.

The panel 2 has upright curved collars 3 matching the shape of an outer surface of the capacitor 1. The collars extend on a predetermined distance around the capacitors 1 when the capacitors 1 are in place. These collars 3 can act as retainers for preventing lateral movement of the capacitors 1 in a predetermined selected direction at their mounting points. The direction can be the same in the fastening point of each capacitor 1.

Above the panel 2 there is provided a tightening plate 4 to be attached thereto. The plate has holes 5 substantially corresponding to the diameters of the capacitors 1 above corresponding mounting points of the panel 2. The holes 5 can have downward collars 6 on the opposite side of the capacitors 1 in relation to the collars 3 of the panel 2 and they extend on a predetermined distance around the capacitors when the capacitors 1 are in place. The collars 6 are not indispensable for the tightening in place of the capacitors 1 but they can protect the isolations of the capacitors 1. For this purpose the material of the collars 6 can be, for example, vulcanized rubber.

For the capacitors 1 placed between the panel 2 and the tightening plate to be fastened and tightened in place between the panel 2 and the tightening plate 4, wedges 7 and 8 can be arranged between the panel 2 and the tightening plate 4 for tightening the collars 3 of the panel 2 and the holes 5 of the tightening plate 4 and their collars 6 from opposite directions against the capacitors 1 in directions perpendicular to their axial directions.

Figure 4:
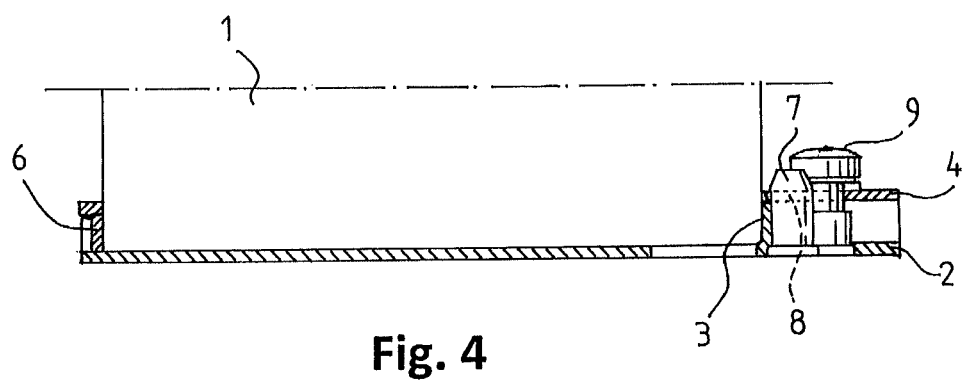
FIG. 4 illustrates a situation in which the capacitor is tightened in place and wedged in accordance with an exemplary embodiment of the disclosure.

The wedges 7 and 8 include a sufficient number of wedging pins 7 in the panel 2 and corresponding wedging holes 8 in the tightening plate 4, and when made to co-operate, these are arranged to tighten the panel 2 and the tightening plate 4 in opposite directions around the capacitors 1. For the mounting of the fastening plate 4, it is desirable that the wedging pins 7 are conical at least in their upper part. When screw fastening is used to fasten the panel 2 and the tightening plate 4 together, the screw fastening can act at the same as a fastening mechanism for the wedges 7 and 8. In this case the screw fastening can include screws 9 that penetrate the tightening plate 4 and attach to the panel 2. In this example, and with particular reference to FIG. 4, the tightening plate 4 moves to the right when the screws 9 are tightened and forces the capacitor 1 to tighten between the collar 3 of the panel 2 and the collar 6 of the tightening plate 4. In this case also the collar 3 of the panel 2 comes into contact with the bottom surface of the tightening plate 4, and the collar 6 of the tightening plate 4 substantially comes into contact with the top surface of the panel 2, the collars 3 and 6 extending in each case on a distance of 180°, at the most, around the capacitor 1.

The panel 2 of the disclosure can be formed for fastening a desired number of capacitors, the size of the capacitors 1 to be fastened being also freely selectable.

The above description of the disclosure is only intended to illustrate the basic idea of the disclosure. A person skilled in the art may, however, implement the basic idea of the disclosure in a variety of ways. The disclosure and its embodiments are thus not restricted to the examples described above, but they may vary within the scope of the attached claims. Hence the retaining means of the bottom plate, for example, are formed of a recess matching the shape of the capacitor bottom.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A capacitor fastening for fastening a capacitor, the capacitor fastening comprising:
   a panel for fastening to a lower part of the capacitor;
   a retainer at a mounting point of the capacitor in the panel for preventing a lateral movement of the capacitor in at least one selected direction;
   a tightening plate for arranging above the panel and for fastening to the panel, the tightening plate having a hole substantially corresponding to a diameter of the capacitor above the mounting point of the panel; and
   a wedge between the panel and the tightening plate for tightening the capacitor in place between the panel and the plate,
   wherein the wedge includes wedging pins in the panel and corresponding wedging holes in the tightening plate, which, when brought into co-operation, are arranged to tighten the retainer of the panel and an edge of the hole of the tightening plate against each other in opposite directions around the capacitor in directions perpendicular to an axial direction of the capacitor.

2. The capacitor fastening as claimed in claim 1, wherein the retainer of the panel comprises:
   a curved collar matching a shape of an outer surface of the capacitor rising from the panel, the collar extending on a first predetermined distance around the capacitor.

3. The capacitor fastening as claimed in claim 1, wherein the hole in the tightening plate comprises:
   a downward collar which is on an opposite side of the capacitor in relation to the collar of the panel and extends in a second predetermined distance around the capacitor.

4. The capacitor fastening as claimed in claim 2, wherein the hole in the tightening plate comprises:
   a downward collar which is on an opposite side of the capacitor in relation to the collar of the panel and extends in a second predetermined distance around the capacitor.

5. The capacitor fastening as claimed in claim 2, wherein the collar of the panel comes substantially into contact with a bottom surface of the tightening plate and the collar of the hole in the tightening plate comes substantially into contact with a top surface of the panel, the collars extending in each case a distance of 180° at the most around the capacitor.

6. The capacitor fastening as claimed in claim 3, wherein the collar of the panel comes substantially into contact with a bottom surface of the tightening plate and the collar of the hole in the tightening plate comes substantially into contact with a top surface of the panel, the collars extending in each case a distance of 180° at the most around the capacitor.

7. The capacitor fastening as claimed in claim 4, wherein the collar of the panel comes substantially into contact with a bottom surface of the tightening plate and the collar of the hole in the tightening plate comes substantially into contact with a top surface of the panel, the collars extending in each case on a distance of 180° at the most around the capacitor.

8. The capacitor fastening as claimed in claim 1, wherein the retainer of the panel comprises:
   a recess made to the panel matching a shape of a capacitor bottom.

9. The capacitor fastening as claimed claim 1, wherein the wedging pins are conical.

10. The capacitor fastening as claimed claim 2, wherein the wedging pins are conical.

11. The capacitor fastening as claimed claim 3, wherein the wedging pins are conical.

12. The capacitor fastening as claimed claim 4, wherein the wedging pins are conical.

13. The capacitor fastening as claimed in claim 1, comprising:
   a screw fastener for fastening the panel and the fastening plate together, the screw fastener acting at the same time as a tightening mechanism for the wedge.

14. The capacitor fastening as claimed in claim 1, wherein the panel, the tightening plate and the wedge are formed for fastening a plurality of capacitors, the size of the capacitors to be fastened being thus also freely selectable.

15. The capacitor fastening as claimed in claim 2, comprising:
   a screw fastener for fastening the panel and the fastening plate together, the screw fastener acting at the same time as a tightening mechanism for the wedge.

16. The capacitor fastening as claimed in claim 3, comprising:
   a screw fastener for fastening the panel and the fastening plate together, the screw fastener acting at the same time as a tightening mechanism for the wedge.

17. The capacitor fastening as claimed in claim 2, wherein the panel, the tightening plate and the wedge are formed for fastening a plurality of capacitors, the size of the capacitors to be fastened being thus also freely selectable.

18. The capacitor fastening as claimed in claim 3, wherein the panel, the tightening plate and the wedge are formed for fastening a plurality of capacitors, the size of the capacitors to be fastened being thus also freely selectable.

19. The capacitor fastening as claimed in claim 4, wherein the panel, the tightening plate and the wedge are formed for fastening a plurality of capacitors, the size of the capacitors to be fastened being thus also freely selectable.

20. A capacitor, in combination with the capacitor fastening as claimed in claim 1.

\* \* \* \* \*